(12) United States Patent
Brokopp

(10) Patent No.: US 8,228,492 B2
(45) Date of Patent: Jul. 24, 2012

(54) SOLAR-POWERED LIGHT INTENSITY MEASUREMENT DEVICE

(75) Inventor: Chad E. Brokopp, Zurich (CH)

(73) Assignee: Regina Reimer, Zurich (CH)

(*) Notice: Subject to any disclaimer, the term of this patent is extended or adjusted under 35 U.S.C. 154(b) by 321 days.

(21) Appl. No.: 12/583,717

(22) Filed: Aug. 24, 2009

(65) Prior Publication Data
US 2010/0045971 A1 Feb. 25, 2010

Related U.S. Application Data

(60) Provisional application No. 61/091,537, filed on Aug. 25, 2008.

(51) Int. Cl.
G01J 3/00 (2006.01)
G01J 1/42 (2006.01)
(52) U.S. Cl. ........... 356/213; 356/51; 356/218; 356/227
(58) Field of Classification Search .................... 356/51, 356/213–227
See application file for complete search history.

(56) References Cited

U.S. PATENT DOCUMENTS

| | | | |
|---|---|---|---|
| 3,145,568 A | 8/1964 | Yellott | |
| 3,198,945 A | 8/1965 | Dewes et al. | |
| 3,742,240 A | 6/1973 | Jonasson | |
| 4,069,716 A | 1/1978 | Vanasco et al. | |
| 4,218,139 A | 8/1980 | Sheffield | |
| 4,253,764 A * | 3/1981 | Morrill | 356/225 |
| 4,264,211 A | 4/1981 | Biggs | |
| 4,308,459 A | 12/1981 | Williams | |
| 4,373,809 A | 2/1983 | Gobrecht | |
| 4,656,419 A * | 4/1987 | Garlick | 324/761.01 |
| 4,678,330 A | 7/1987 | Gutschick et al. | |
| 4,897,672 A * | 1/1990 | Horiuchi et al. | 347/236 |
| 5,036,311 A | 7/1991 | Moran et al. | |
| 5,162,935 A * | 11/1992 | Nelson | 398/107 |
| 6,979,811 B2 | 12/2005 | Tatsuno | |
| 7,232,987 B2 | 6/2007 | Webbeking et al. | |
| 7,271,887 B2 | 9/2007 | Bickel et al. | |
| 7,534,034 B2 * | 5/2009 | Clemens et al. | 374/178 |
| 7,696,461 B2 * | 4/2010 | Sinton et al. | 250/203.4 |
| 2006/0145053 A1 * | 7/2006 | Stevenson et al. | 250/205 |
| 2008/0204053 A1 * | 8/2008 | Grebner | 324/706 |
| 2009/0303467 A1 * | 12/2009 | Ashdown et al. | 356/217 |

OTHER PUBLICATIONS

Xiao, X., Light Absorption by Leaf Chlorophyll and Maximum Light Use Efficiency, IEEE Transactions on Geoscience & Remote Sensing, vol. 44, No. 7, Jul. 2006.

* cited by examiner

*Primary Examiner* — Hoa Pham
(74) *Attorney, Agent, or Firm* — Ballard Spahr, LLP

(57) ABSTRACT

There is provided a solar powered light intensity measurement device which includes one or more photovoltaic cells, one or more resistors and one or more light emitting diodes. The one or more photovoltaic cells convert light to electricity, the output corresponding to the intensity of incident light. Electrically activated from the photovoltaic cells, through the one or more resistors, the light emitting diodes emit a signal color, further corresponding to their electrical activation and hence to the intensity of light incident upon the one or more photovoltaic cells. The signal color is compared to reference color or chart for use in determining the relevant light intensity. In one embodiment, the device further includes an analog switch.

25 Claims, 4 Drawing Sheets

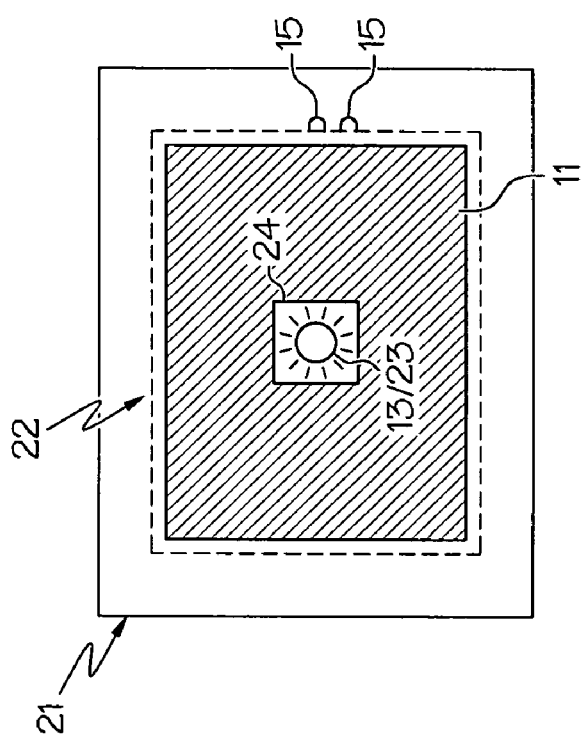
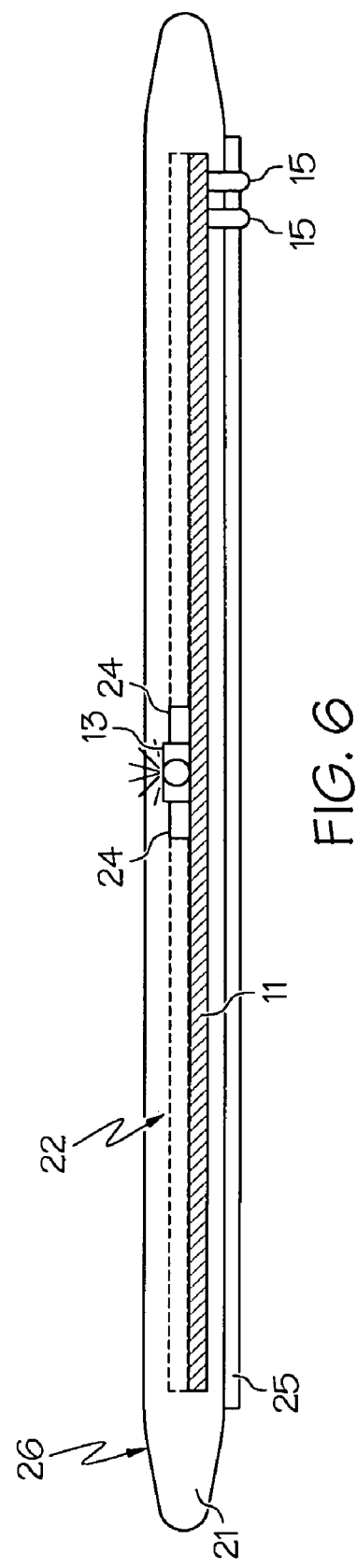

SOLAR-POWERED LIGHT INTENSITY MEASUREMENT DEVICE

CROSS REFERENCE TO RELATED APPLICATIONS

This application claims priority from the provisional patent application Ser. No. 61/091,537 filed Aug. 25, 2008 in the name of Chad Eric Brokopp, entitled "Solar-Powered Photosynthetic Active Radiation Intensity Measurement Device" and incorporated herein by reference.

FIELD

The present invention relates to the measurement of the intensity of light within a specified portion of the light spectrum.

BACKGROUND

It is often necessary or desirable to obtain a measurement of the intensity of light within a particular spectral region, in a particular location. This need arises in a variety of contexts.

For example, photosynthetic active radiation (PAR) designates the spectral range of solar light from 400 to 700 nanometers that photosynthetic organisms use during photosynthesis. While nearly all plants absorb radiation in the PAR range, the required light intensity varies significantly from plant to plant. Each plant demonstrates its best performance when subject to its optimal light intensity. Optimal light intensities vary from full sunlight to complete shade, depending on the species. Full sunlight, which is optimal for a plant like maize (*Zea mays* L.) would be lethal to an understory plant like clover (*Trifolum* sp.). For plant owners, horticulturalists and botanists, for example, matching the light source to a plant's optimal lighting condition is essential to the plant's livelihood.

A similar measurement may be necessary underwater, to determine, for example, the optimal light conditions for underwater plant and animal life.

Likewise, ultraviolet (UV) radiation lies in the spectral range of solar light from approximately 100 to 400 nanometers. UV radiation most notably causes sunburn, however, it is also used extensively in both curing systems and sterilization systems. As such, the detection of UV light is useful in a variety of applications. A person visiting the beach may wish to detect the intensity of UV light for the purpose of determining the sun protection factor (SPF) necessary to prevent sunburn. A scientific researcher may need to detect the intensity of a UV light bulb in order to determine whether a particular bulb is effective for germicidal irradiation. Similarly, a dentist may wish to detect whether the intensity of light produced by a UV bulb in a light curing system is effective for curing various composites and materials used in dentistry.

Existing devices, commonly referred to as radiometers or photometers, vary significantly in functionality. For example, many existing devices quantify the accumulation of light over time. Because this type of device does not provide an instantaneous reading it is impractical in many situations. It is untimely for a casual plant owner wishing to position a new plant in optimal lighting conditions. Similarly, a device that measures light accumulation over an extended period of time is untimely for an individual wishing to apply sunscreen upon arrival at the beach. Further, existing devices are either battery-powered or require an external power source. Use of batteries has major disadvantages including cost, inconvenience and environmental toxicity. And providing an external power source is difficult in many situations, including where the device is intended for use outdoors. As such, the power source requirement is often prohibitive.

In view of the foregoing, there is a need to provide a self-contained, battery-free light intensity measurement device. The device should be small and flexible such that it is useful in a variety of light intensity measurement applications. It is further desirable that such a device be inexpensive to manufacture such that the device can be offered in a disposable form. The present invention addresses one or more of these needs.

SUMMARY

According to one embodiment of the present invention there is provided a solar-powered device for measuring the intensity of light within a specified portion of the light spectrum with one or more photovoltaic cells and one or more light emitting diodes (LEDs). The one or more photovoltaic cells convert incident light to electricity, the electrical output corresponding to the intensity of incident light. The light emitting diodes are connected with the one or more photovoltaic cells and emit a light signal of a color further corresponding to the intensity of light incident upon the one or more photovoltaic cells. The light signal color can be compared to a reference color or chart in order to determine the relevant light intensity.

The color of light emitted can be the result of plural LEDs emitting light of differing colors that are combined to make up the light signal color. One or more resistors, differing in value, can alter the electrical input to the plural LEDs to effect differing light color emissions from the LEDs in response to any electrical output from the one or more photovoltaic cells.

In various embodiments, the device may be thin, flexible, waterproof and may include adhesive backing or other attachment means.

According to yet another embodiment, the device comprises an analog switch activated in response to light intensities of a chosen value.

Other independent features and advantages of the light intensity measurement device will become apparent from the following detailed description, taken in conjunction with the accompanying drawings which illustrate, by way of example, the principles of the invention.

BRIEF DESCRIPTION OF THE DRAWINGS

FIG. 5 is a top plan view of the device according to an embodiment of the present invention;

FIG. 6 is a cross-sectional view of the device according to the embodiment of FIG. 5.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding Background or Summary or the following Detailed Description. Reference will now be made in detail to exemplary embodiments, examples of which are illustrated in the accompanying drawings. Wherever possible, the same reference numbers will be used throughout the drawings to refer to the same or like parts.

Figure 1:
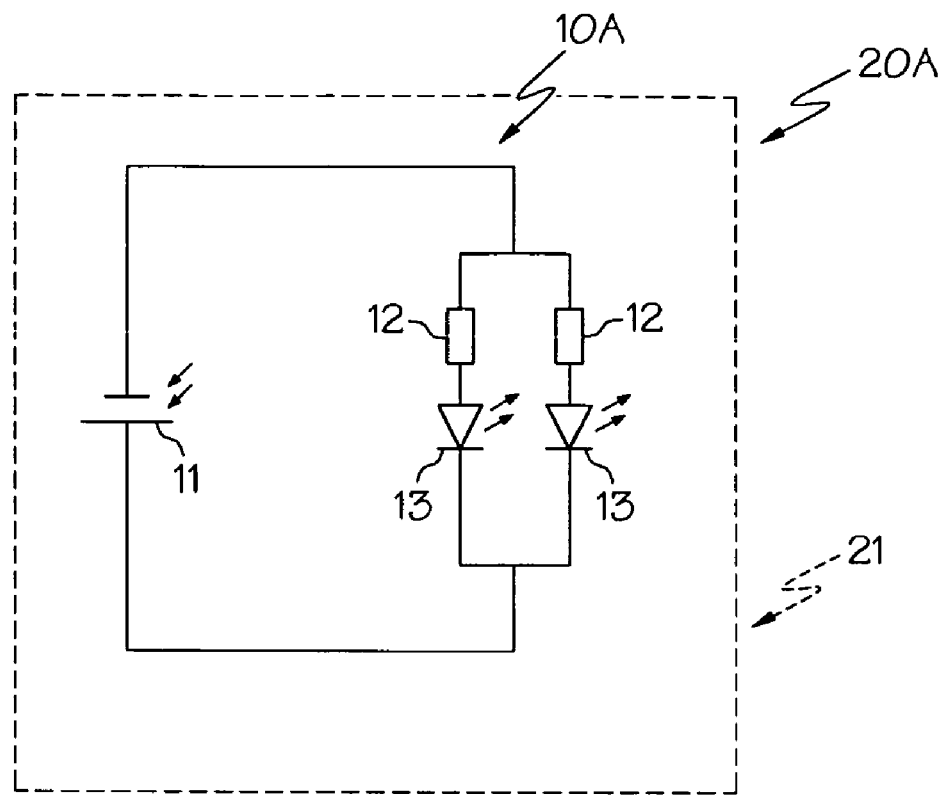
FIG. 1 is a schematic circuit diagram according to an embodiment of the present invention.
Figure 2:
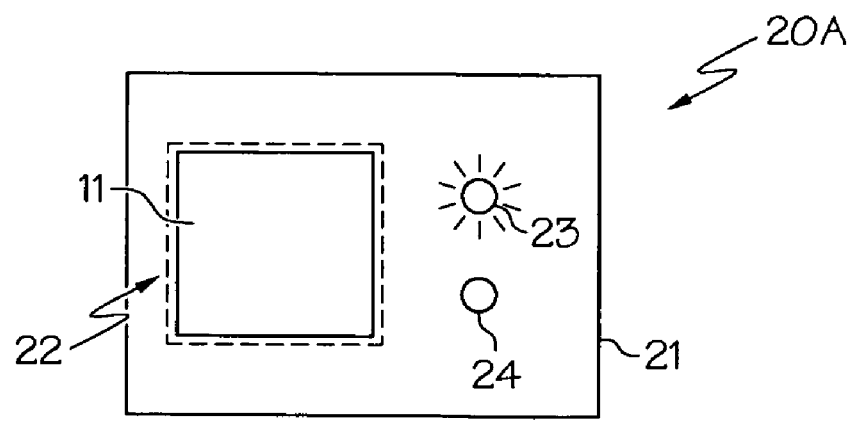
FIG. 2 is a top plan view of a physical device incorporating the circuitry of FIG. 1.

As illustrated in FIGS. 1 and 2, the solar-powered light intensity measurement device 20A has a circuit 10A with one or more photovoltaic cells 11, one or more light emitting diodes (LEDs) 13, and one or more resistors 12. The one or more photovoltaic cells 11 receive light at various intensities. They convert the light into electrical power, which drives the one or more LEDs 13. The LEDs 13 illuminate non-linearly such that a light signal 23 is emitted in a range of colors depending on applied voltage, which varies with the intensity of light incident upon the one or more photovoltaic cells 11. The one or more resistors 12 may differ in resistance to provide differing voltages at the LEDs 13. This can broaden or alter the color range of the emitted light signal 23 even when LEDs 13 of the same kind are used. Alternatively, the one or more LEDs 13 may include LEDs 13 of differing characteristics for the same effect. The device 20, which refers to both device 20A and device 20B, is suitable for indoor or outdoor measurements.

The one or more photovoltaic cells 11 function as both a photosensor and a power source. The one or more photovoltaic cells 11 are preferably made of monocrystalline silicon, polycrystalline silicone, amorphous silicon, cadmium sulfide, or cadmium telluride, however, any material or prefabricated device that converts light to electricity by photovoltaic effect is within the inventive concept. The preferred type of photovoltaic cell 11 may vary according to the application. For example, for use in detecting the intensity of PAR for purposes of positioning a plant in its optimal light intensity, a photovoltaic cell 11 must operate at the wavelengths that make up the PAR range. In this regard, photovoltaic cell characteristics are readily available from their manufacturer at internet websites. Similarly, for use in detecting the intensity of UV light for purposes of determining which sunscreen product provides sufficient protection, or for detecting whether a UV bulb is providing sufficient intensity to properly sterilize a desired site, a photovoltaic cell 11 must operate at the wavelengths that make up the UV range.

Figure 3:
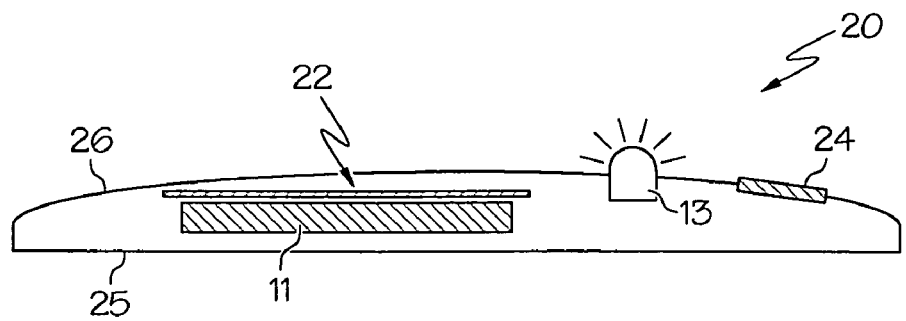
FIG. 3 is a cross-sectional view of the device according to an embodiment of the present invention.

According to one or more embodiments, it may be necessary or desirable to use a light filter 22 to negate the contribution of light from spectral regions other than that sought for measurement. As shown in FIGS. 2, 3 and 6, the filter 22 is preferably positioned proximate to the one or more photovoltaic cells 11, between the cells 11 and the source of light to be measured. The filter 22 provides that wavelengths outside of the desired spectral range are excluded from light incident upon the one or more photovoltaic cells 11. The filter 22 may be any of the commercially available films that alone, or in combination, selectively pass only, or substantially only, the desired wavelengths, i.e., the wavelengths intended for measurement.

Referring to FIG. 1, the light that reaches the one or more photovoltaic cells 11 is converted to electricity, which drives the one or more LEDs 13. The LEDs 13 illuminate non-linearly such that a light signal 23 is emitted that varies in color according to the absorbed light intensity illuminating the photovoltaic cells 11. The one or more LEDs 13 may be a single LED, a bicolor LED, a tricolor LED, a multicolored LED or multiple single LEDs positioned proximate to one another such that the emitted light signal 23 appears as one color, although any LED 13 is within the inventive concept. For example, using one red LED 13 and one green LED 13 causes the resulting color of the light signal 23 to range from red to yellow to green, depending on the light intensity absorbed by the one or more photovoltaic cells 11. The specifications of the one or more LEDs 13 should be chosen according to the desired application.

Referring still to FIG. 1, in addition to affecting the range of colors of the emitted light signal 23, the one or more resistors 12 further prevent the one or more LEDs 13 from overloading.

Figure 7:
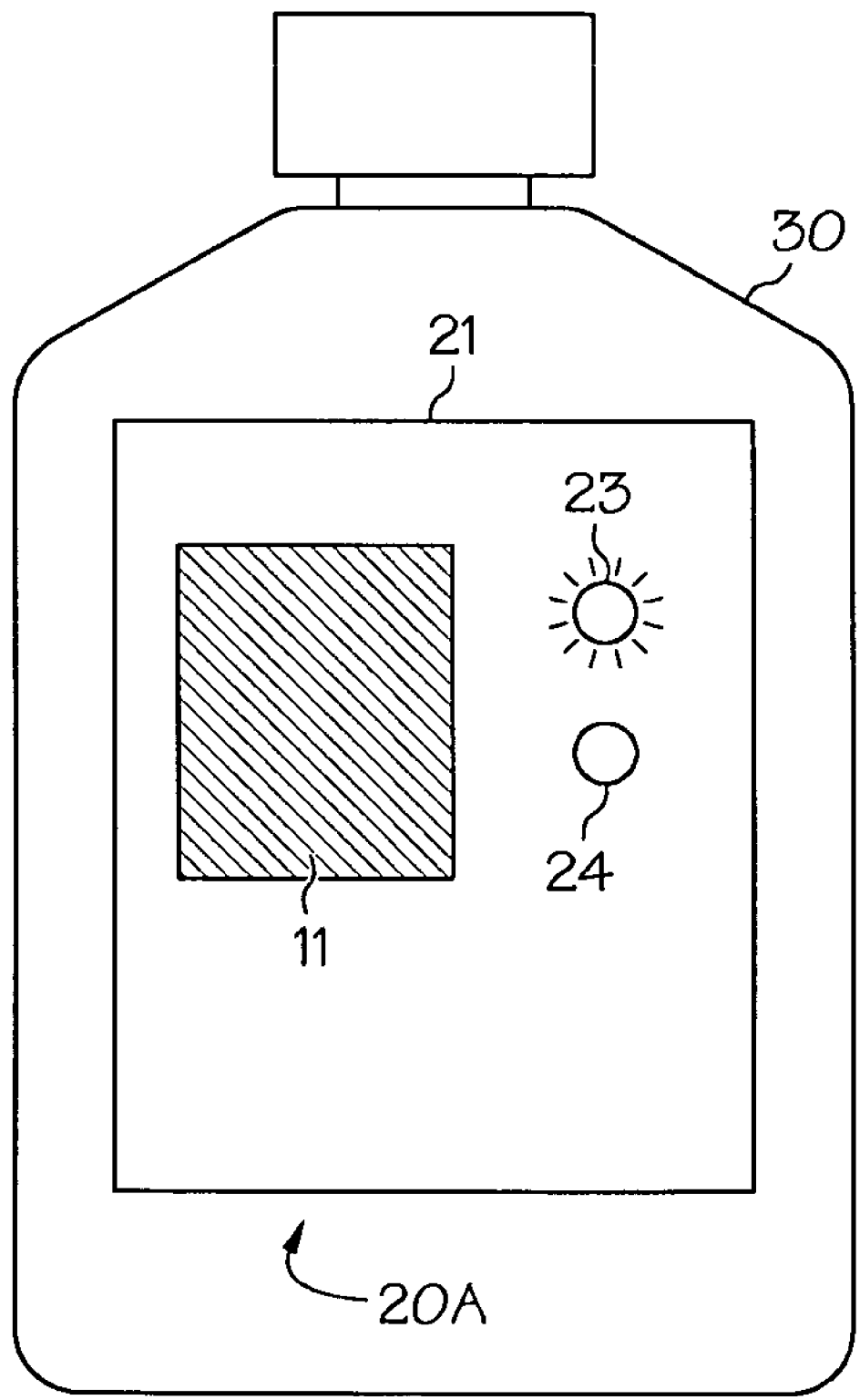
FIG. 7 is a front elevational view of a container provided with a light intensity measuring device according to an embodiment of the present invention.

As shown in FIGS. 1, 2, 4 and 5, the electrical circuit 10 (referring to 10A and 10B collectively) is disposed within a casing 21. The casing 21 is preferably thin and flexible. However, non-flexible casings 21 and casings 21 of any size are also within the inventive concept. The casing 21 may be of bitumen, polyethylene terephthalate, polyethylene silicate, polyvinyl chloride, polypropylene, rubber ethylene propylene diene monomer (M-class) rubber, or any other material capable of adequately enclosing the electrical circuit 10 for use in the desired application. The casing 21 may be any shape and is not limited to the rectangular shape disclosed in FIGS. 2 and 5. The upper surface 26 of the casing 21, as shown in FIGS. 3 and 6, may be planar, convex or concave. The casing 21 may further include a post, stand or other support, or a portion designed for attaching the casing 21 to a post, stand or other support. Alternatively, the casing 21 may comprise an adhesive surface 25, as shown in FIGS. 3 and 6, such that the device 20 may be adhesively mounted to a surface. The casing 21 should be water-impenetrable in the event that it may be subject to a moist environment or completely submerged in water. For use in some applications, such as medical or experimental purposes, the casing 21 should be of a material designed to withstand conditions including moist heat by steam autoclaving, dry heat, ethylene oxide gas and gamma radiation for the purpose of sterilization. According to yet another embodiment, the casing 21 may be incorporated in another product or another product's packaging. For example, as shown in FIG. 7, the electrical circuit 10 described may be contained within the wall of a container, such as a container 30 designed to contain a sunscreen product, or a pot or package used for selling and/or growing plants.

The color of the light signal 23, consisting of the combination of light emitted by the one or more LEDs 13, is, in many uses, preferably compared to a reference 24, as illustrated in FIGS. 2, 3, 5 and 6. According to one embodiment, the reference 24 is a single color, which represents the optimal light intensity for a particular application. According to another embodiment, the reference 24 is a chart that indicates either a range of light intensities relevant to a particular application, or the optimal light intensities for various applications. The reference 24 may be located upon the device 20 itself. Alternatively, the reference 24 may be separately provided or otherwise obtained. For example, the reference 24 may be provided by the device manufacturer or distributor, or obtained via the internet. By matching the light signal color 23 to the reference 24, users can determine either the intensity of light in a given location, or the intensity of light as it pertains to a particular application.

When held, mounted or otherwise positioned in a particular location, the one or more photovoltaic cells 11 receive light at a particular intensity. By way of example only, one embodiment of the device 20 may use a commercially available 3.0V, 100 mA thin, flexible solar cell 11, a commercially available duo 3 mm red/green LED 13 (2.0V minimum and 2.5V maximum for red and 2.2V minimum and 2.5V maximum for green), and parallel resistors 12 of 1 ohm and 147 ohms. If a low intensity light contacts the solar cell 11, the red LED may receive 2.0V and the green LED may receive 1.8V. Because the 1.8V is lower than the minimum voltage for the green LED, the green LED remains off. Because the 2.0V at the red LED is the minimum voltage, the red light will illuminate. Accordingly, the light signal 23 will appear red.

If a medium intensity light contacts the solar cell 11, the red LED may receive 3.0V and the green LED may receive 2.2V. Because the 3.0V is higher than the 2.5V maximum, the red LED will emit a high intensity red light. Because the 2.2V is the minimum for the green LED, the green LED will emit a modest green light. The combination of the high intensity red light and the modest green light creates a yellow light signal 23.

If a high intensity light contacts the solar cell 11, the red LED may receive 6.0V and the green LED may receive 4.0V. Because the 6.0V and the 4.0V are higher than the maximum for each LED, each LED will emit a high intensity red or green light. Because the maximum green light is much more powerful than the maximum red light, the light signal 23 appears green.

Further, and also by way of example only, the foregoing circuit 10 may be incorporated into the packaging 30 of a sunscreen-related product, or otherwise used in connection with sunscreen or UV protection, as shown in FIG. 7. The protection provided by sunscreen is dependent upon both the sun protection factor (SPF) and the UV-index. By assuming a fixed duration of UV exposure, the device 20 can be used to determine the UV intensity at which a given SPF is sufficient or insufficient to prevent sunburn. For example, at a low UV intensity, both an SPF 15 and SPF 30 bottle may show a green light signal 23, indicating that both SPF 15 and SPF 30 are sufficient to prevent sunburn at the detected UV intensity. However, at a medium intensity, an SPF 15 bottle may emit a red signal color, while an SPF 30 bottle emits a green signal color, indicating that the SPF 15 is insufficient, but the SPF 30 is sufficient. In higher intensity UV light, both the SPF 15 and the SPF 30 may emit red signal colors, indicating that neither SPF 15 nor SPF 30 is sufficient to prevent sunburn. The minimum voltage of the one or more LEDs 13 and/or the values of the one or more resistors 12 are used to determine the light intensity at which the light signal 23 changes from green to red for each level of SPF.

Similarly, and still by way of example only, an embodiment of the device 20 may be located within a UV hood in a research laboratory, or elsewhere where sterilization or germ reduction is necessary or desired. The device 20 may be used to determine when the intensity of UV light emitted from the UV bulb is insufficient for germicidal irradiation. When the light intensity drops below a predetermined level, the light signal 23 changes color indicating that the UV bulb must be replaced.

Figure 4:
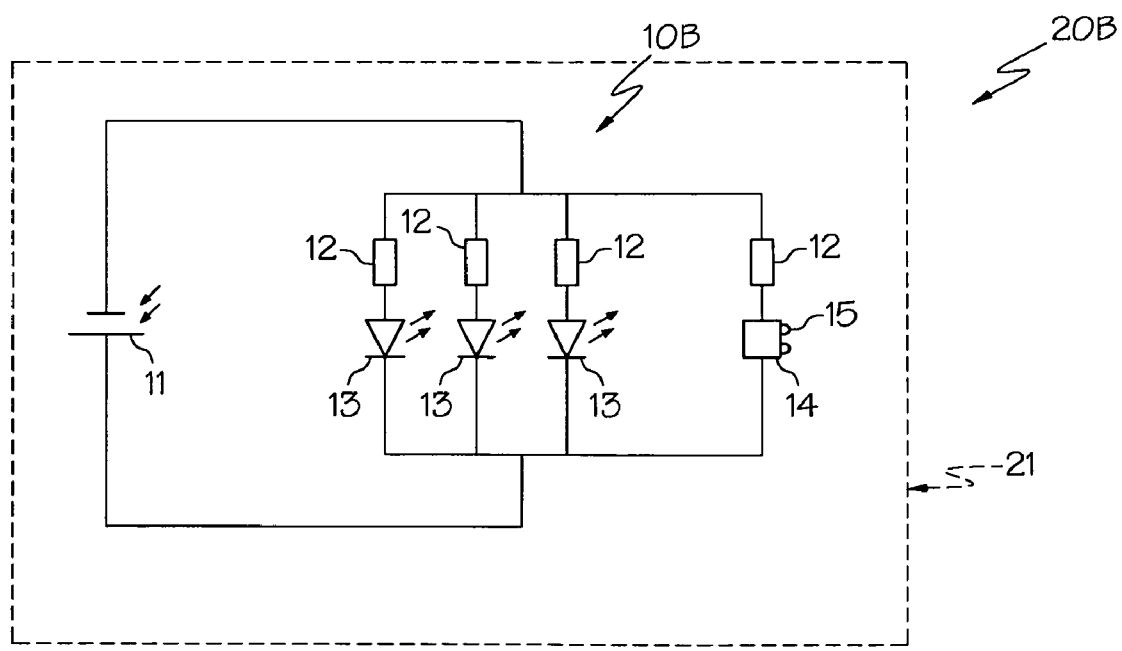
FIG. 4 is a schematic circuit diagram according to a further embodiment of the present invention.

According to yet another embodiment, as illustrated in FIG. 4, the device 20B may further include an analog switch 14 or other switching circuit or device acting, for example, in the manner of a relay. The switch 14, located in parallel with the one or more LEDs 13, creates a threshold voltage which corresponds to a minimum light intensity at which the switch 14 is closed (or opened, as the case may be) and a secondary device (not pictured) is put into (or out of) an operational state. This embodiment is useful where it is necessary or desirable to begin or cease operation of a system when the intensity of a light does not meet a predetermined threshold. For example, the disclosed light intensity measurement device 20B may be designed for use within a UV light curing system (not pictured). When the curing system is powered on, the UV light contacts the one or more photovoltaic cells 11 within the light intensity measurement device 20B built into the curing system. If the UV light intensity is above the predetermined threshold, the light signal 23 appears green and the switch 14 remains closed, allowing the curing system to operate. If the UV light intensity does not meet the predetermined threshold, the light signal 23 appears red and the switch 14 opens, causing the light curing system to turn off.

As illustrated in FIGS. 4, 5 and 6, the switch 14 may include output nodes 15 (schematically shown), which can be any desired type of electrical connector. The output nodes 15 serve as an attachment point to additional circuits or secondary devices (not pictured), enabling the switch 14 to switch electrical power to the circuits or devices to activate them when the one or more photovoltaic cells 11 are sufficiently intensely illuminated.

The above-described embodiments provide significant advantages over the devices found in the prior art. For example, the device 20 eliminates the need for either environmentally toxic batteries or an external power source. Further, the device 20 can be built to be small, thin and flexible, which allows for use of the device 20 in a variety of applications. And because the device 20 can be built inexpensively with environmentally friendly components, the device 20 may be readily disposable. Because the light signal 23 appears instantly, there is no waiting time before viewing the results. In summary, the advantages include size, cost, ecological responsibility, time and convenience.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

What is claimed is:

1. A device, comprising;
    a light responsive component including one or more photovoltaic cells configured to receive light in a predetermined spectral range, the light having a specific light intensity;
    one or more resistors; and
    one or more light emitting diodes;
    the one or more photovoltaic cells being configured to deliver an electrical output to the one or more resistors and the one or more light emitting diodes in response to the light, the electrical output being determined at least by the specific light intensity;
    wherein the one or more light emitting diodes emit a light signal in response to the electrical output, the light signal having a color indicative of the specific light intensity, thereby measuring the specific light intensity.

2. The device according to claim 1, the light responsive component further comprising one or more filters located to filter the light.

3. The device according to claim 1, wherein the one or more light emitting diodes comprise plural light emitting diodes and the one or more resistors comprise plural resistors of varying resistance therefore providing differing light emission characteristics from the one or more light emitting diodes at various intensities of the light.

4. The device according to claim 1, further comprising an analog switch connected in parallel with the one or more light emitting diodes and the one or more resistors, and electrically connected with the one or more photovoltaic cells for switching in response to the specific light intensity.

5. The device according to claim 1, further comprising a reference for comparison with the light signal.

6. The device according to claim 1, wherein the light responsive component is selectively responsive to light in at least one spectral range, the light signal having a color indicative of light intensity in the at least one spectral range.

7. The device according to claim 6, wherein the at least one spectral range is or includes the ultraviolet.

8. The device according to claim 7, wherein the color is indicative of the suitability of lighting for germicidal irradiation.

9. The device according to claim 7, wherein the color is indicative of a sunscreen's suitability for protection at a detected ultraviolet intensity.

10. The device according to claim 9, wherein the device is disposed upon or formed within a sunscreen container.

11. The device according to claim 6, wherein the at least one spectral range includes photosynthetic active radiation.

12. The device according to claim 11, wherein the color is indicative of the suitability of a location for a plant or plants based on light in that location.

13. The device according to claim 1, wherein the one or more photovoltaic cells, the one or more resistors and the one or more light emitting diodes provide a sensitivity to illumination at a desired depth underwater and wherein the device further includes a waterproof casing.

14. The device according to claim 1, wherein the one or more photovoltaic cells supply all of the electrical power necessary to operate the one or more light emitting diodes.

15. The device according to claim 1, further comprising an electrically activated switch electrically connected with the light responsive component and switching responsive to electrical activation at a level resulting from a predetermined level of illumination.

16. The device according to claim 1, wherein the one or more light emitting diodes comprise a plurality of light emitting diodes having substantially the same operating characteristics, and the one or more resistors comprise a plurality of resistors connected with the plurality of light emitting diodes and thereby altering the response of the plurality of light emitting diodes, one from the other, to effect differing responses of the light emitting diodes at each level of intensity of illumination of the one or more photovoltaic cells.

17. The device according to claim 16, wherein each of the plurality of resistors is connected in series with one of the plurality of light emitting diodes, and each of the series-connected resistors and light emitting diodes are connected in parallel with other series-connected resistors and light emitting diodes and with the one or more photovoltaic cells.

18. The device according to claim 1, wherein each of the one or more resistors is connected in series with one of the one or more light emitting diodes and each series-connected resistor and light emitting diode is connected to the one or more photovoltaic cells.

19. A solar-powered device, comprising;
a first means for sensing incident light and, in response, generating an electrical signal determined at least by intensity of the incident light;
a second means for generating a light signal color determined at least by the intensity of the incident light, the second means coupled to the first means and responsive to the electrical signal; and
indicia comprising at least one reference equating the generated light signal color to the intensity of incident light, the at least one reference being specific to an application.

20. The solar-powered device according to claim 19, wherein the first means for sensing the incident light and generating the electrical signal comprises means for converting light to electricity.

21. The solar-powered device according to claim 19, wherein the second means for generating the light signal color comprises means for emitting light and resistive means for conducting electricity, wherein the resistive means for conducting electricity have differing resistance electrically connected with the means for emitting light and the first means.

22. The solar-powered device according to claim 19, further comprising a means for negating the contribution of light from spectral regions other than a region sought for measurement.

23. The solar-powered device of claim 22, wherein the means for negating the contribution of light from spectral regions other than a region sought for measurement comprises a light filter or light filtering film.

24. A method comprising:
providing a device comprising,
a light responsive component including one or more photovoltaic cells configured to receive light in a predetermined spectral range, the light having a specific light intensity;
one or more resistors; and
one or more light emitting diodes;
the one or more photovoltaic cells being configured to deliver an electrical output to the one or more resistors and the one or more light emitting diodes in response to the light, the electrical output being determined at least by the specific light intensity;
wherein the one or more light emitting diodes emit a light signal in response to the electrical output, the light signal having a color indicative of the specific light intensity, thereby measuring the specific light intensity;
providing for placement of the device in a location where a light intensity measurement is desired;
allowing observation of a light signal color emitted by the device; and
providing a reference for comparison with the color of the light signal.

25. A device, comprising;
a plurality of photovoltaic cells configured to receive light having a specific intensity from a light source external to the device, each photovoltaic cell of the plurality of photovoltaic cells being configured to absorb at least a portion of the light in a specific spectral region spanning one or more of a portion of the ultraviolet (UV) region or a portion of the photosynthetic active radiation region;
a plurality of resistors;
a plurality of light emitting diodes (LEDs) respectively connected to the plurality of resistors, each photovoltaic cell of the plurality of photovoltaic cells being configured
to convert the light into an electrical output determined at least by the specific light intensity, and
to deliver the electrical output to at least one resistor of the plurality of resistors and at least one LED of the plurality of LEDs;

the at least one LED being configured to emit a light signal in response to the electrical output;

the device emitting a resulting light signal comprising one or more light signals being emitted from one or more LEDs of the plurality of LEDs, the resulting light signal having a color indicative of the specific light intensity; and a water-impenetrable casing containing the plurality of photovoltaic cells, the plurality of resistors, and the plurality of LEDs, the water-impenetrable casing being suitable for attachment of the device to a support.

* * * * *